Aug. 17, 1926. 1,596,750
V. V. MESSER
MACHINE FOR PLACING GROUPS OF ARTICLES
Filed June 21, 1923 7 Sheets-Sheet 1

WITNESSES
INVENTOR
Vladimir V. Messer
BY
Knight Bro
ATTORNEYS

Aug. 17, 1926.  1,596,750
V. V. MESSER
MACHINE FOR PLACING GROUPS OF ARTICLES
Filed June 21, 1923  7 Sheets-Sheet 2

WITNESSES

INVENTOR
Vladimir V. Messer
BY Knight Bro
ATTORNEYS

Aug. 17, 1926.

V. V. MESSER 1,596,750

MACHINE FOR PLACING GROUPS OF ARTICLES

Filed June 21, 1923  7 Sheets-Sheet 3

Fig. 5.

WITNESSES
Oliver W. Holmes

INVENTOR
Vladimir V. Messer
BY Knight Bros
ATTORNEYS

Aug. 17, 1926.  
V. V. MESSER  
1,596,750  
MACHINE FOR PLACING GROUPS OF ARTICLES  
Filed June 21, 1923   7 Sheets-Sheet 7

WITNESSES
Oliver W. Holmes

INVENTOR
Vladimir V. Messer
BY Knight Bro
ATTORNEYS

Patented Aug. 17, 1926.

1,596,750

UNITED STATES PATENT OFFICE.

VLADIMIR V. MESSER, OF DOUGLASTON, NEW YORK, ASSIGNOR TO V. V. MESSER MANUFACTURING COMPANY, INC., OF LONG ISLAND CITY, NEW YORK, A CORPORATION OF NEW YORK.

MACHINE FOR PLACING GROUPS OF ARTICLES.

Application filed June 21, 1923. Serial No. 646,789.

This invention relates to a machine for automatically distributing articles according to a prearranged plan, and more particularly to a machine which not only distributes the articles according to a prearranged plan, but also comprises means for transferring such distributed articles from the distributing machine to a second location without disturbing the relative positions of the articles.

As a useful embodiment of my invention, I will describe its application to the placing of washers for rubber heels in the vulcanizing mold.

In the manufacture of rubber heels for shoes, the burrs or washers are mounted upon pins in the heel molds, so as to be completely embedded in the rubber stock when the blocks of raw rubber are forced into the molds and vulcanized. The operation of placing the burrs or washers upon the pins in the heel molds has, up to the present invention, been performed by hand at the expenditure of a great deal of time.

The object of the present invention is to produce a machine which will mechanically arrange the burrs or washers in position to be placed upon the pins in the heel cavities of a multiple mold, so as to greatly reduce the time and cost of this operation. To this end, the present invention comprises means for separating the desired number of burrs or washers from a source of supply, and arranging said separated burrs or washers in a predetermined relationship corresponding with the relationship of the receiving pins of the mold cavities of a multiple mold, and means for bodily moving said arranged group of separated burrs or washers into position upon the mold pins.

More specifically, the present invention consists of a power-driven machine having a reciprocating recessed plate or platform containing a series of properly arranged pockets for separating and arranging burrs or washers, a dumping trough for depositing a quantity of burrs or washers upon said separating plate or frame, and a return plate or chute arranged to receive the surplus burrs or washers that fall from said separating plate or frame and lead them back into the dumping trough for a succeeding operation. Any simple form of power mechanism can be employed for reciprocating the separating frame. This operating mechanism consists preferably of a drive shaft geared to a pitman connected with the shaking frame, and an automatic clutch, which is thrown into action by the operation of dumping the supply trough. An automatic throw-out is also preferably provided for throwing the machine out of action after it has operated for a sufficient time to surely separate and position a full set of burrs or washers upon the plate or frame.

For the purpose of transferring a set of burrs or washers from their position upon the separating plate or frame to the pins in the heel cavities of the multiple mold, I provide a perforated plate having the same number of perforations as the set of arranged burrs or washers with the perforations arranged to correspond in position with the burrs or washers on the separating frame, and a concave or dished suction separator of sufficient size to cover substantially the entire face of the perforated plate communicating through a flexible pipe with an air exhaust pump, and provided with a controlling valve, so that by pressing said suction separator down upon the perforated plate and opening the controlling valve, the perforated plate with all of the individual burrs or washers will be lifted and held in their arranged relation, and by moving the suction separator into registry position above the multiple molds, the burrs or washers will be individually placed above the pins in the mold cavities and, by breaking the suction, by closing the valve, said burrs or washers will be accurately deposited upon the mold pins.

In addition to these main features, the invention comprises important details of construction for facilitating the carrying out of the purpose of the invention in an economical and effective manner.

A machine embodying the various features of my invention is illustrated in the accompanying drawings, in which—

Figure 1:
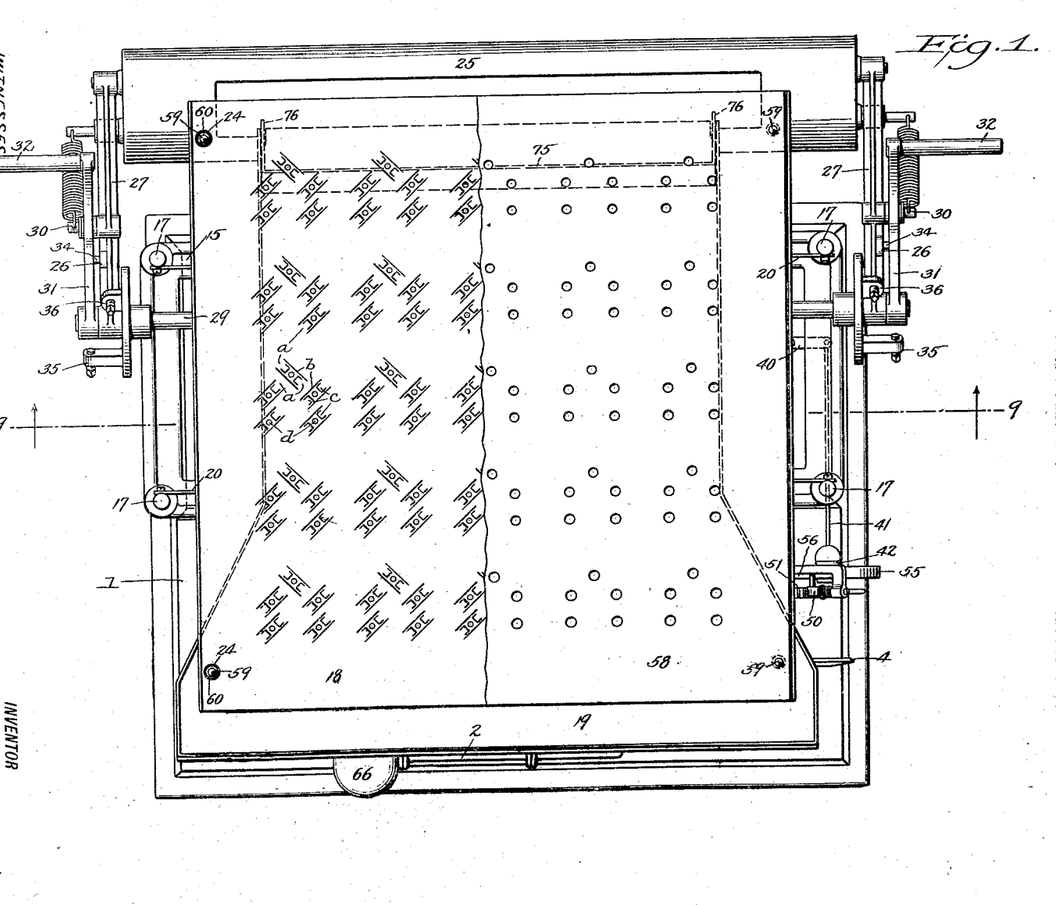
Figure 1 is a plan view.
Figure 6:
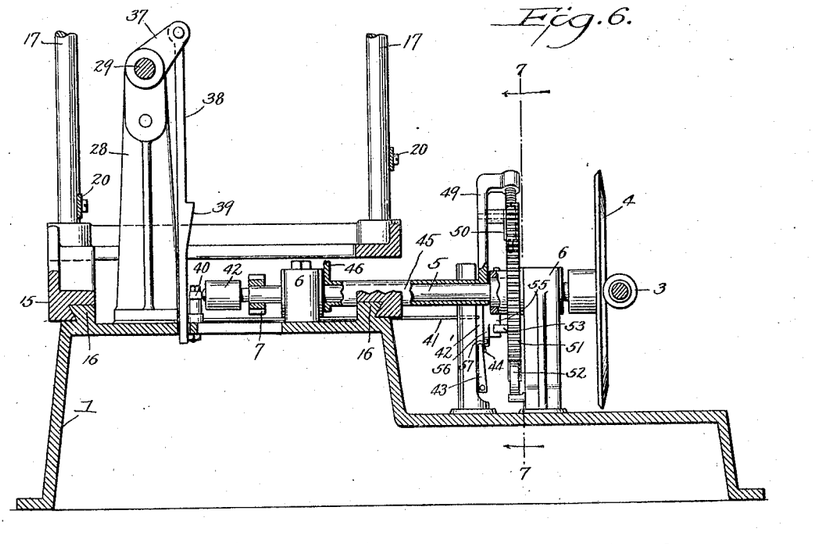
Figure 6 is a transverse vertical section on line 6—6 of Figure 5.
Figure 7:
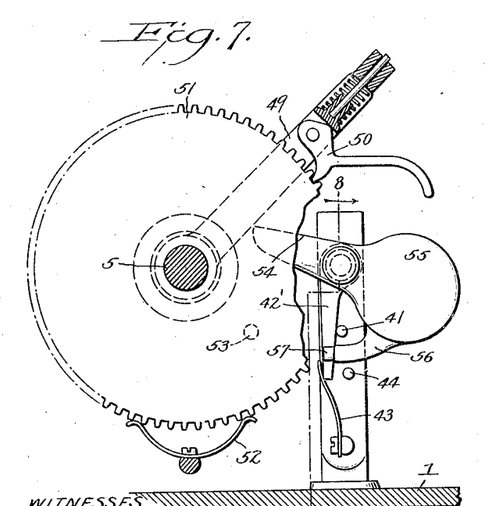
Figure 7 is a view in elevation and partial section, of the tripping mechanism.
Figure 8:
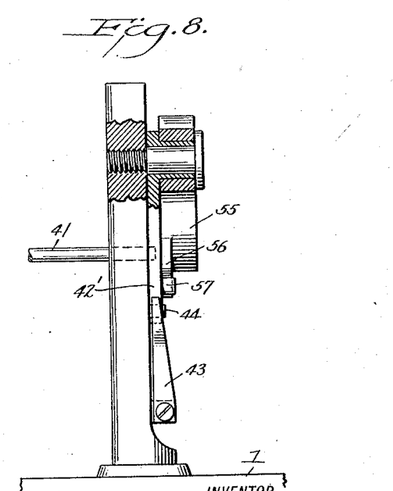
Figure 8 is a section at right angles to the plane of Figure 7, taken on line 8—8 of Figure 7.
Figure 9:
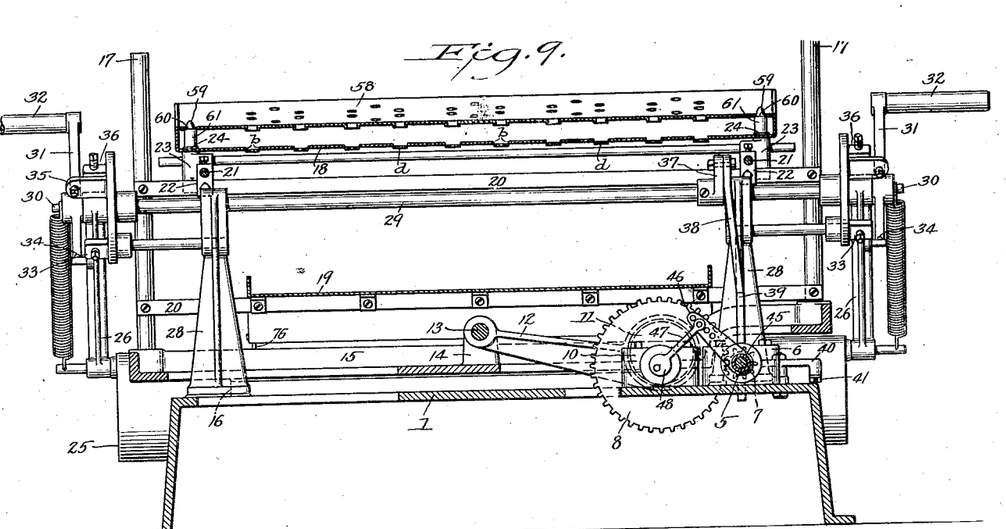
Figure 9 is a longitudinal vertical section taken on line 9—9 of Figure 1.
Figures 18, 19, 20, 21, 22:
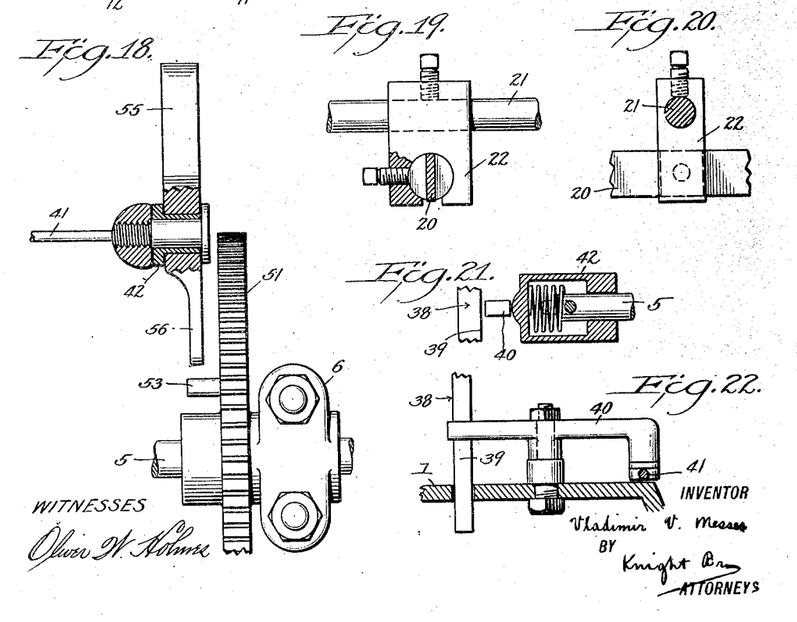
Figure 18 is a detail in elevation and partial section, of the tripping mechanism.
Figures 19 and 20 are right angle elevations of adjusting clamps.
Figure 21 is a section of a detail of the tripping mechanism.
Figure 22 is an elevation of another detail of the same.

In the drawings, 1 indicates a bed plate upon which is mounted a suitable motor 2, which drives through friction gears 3, 4 a shaft 5, mounted in bearings 6. A pinion 7 on the shaft 5 meshes with a gear wheel 8, mounted on a shaft 9, supported in bearings 10. An eccentric 11 on shaft 9 operates an eccentric rod 12 that is articulated by pin 13, with stanchions 14 mounted upon a reciprocating frame 15. This reciprocating frame is guided by dove-tail guides 16, secured to the bed plate 1. By means of the mechanism just described, the plate 15 is given a rapid reciprocating motion for the purpose hereinafter described. Four stanchions 17 rise from the four corners of the reciprocating plate 15 and serve as supports for the distributing tables 18 and 19, through the medium of transverse rods 20. Two longitudinal inclined rods 21 are clamped to the transverse rods 20 by an easily adjustable clamping block 22, clearly shown in Figures 19 and 20. Upon these inclined rods are mounted four platen supports 23, the distributing platen 18 resting upon them and accurately held in position by shoulders 24 (see Figure 3). The inclination of this platen 18 is made such that the articles to be distributed will not quite slide of their own weight, but will tend to move downward when the platen is agitated, following a zig-zag path, due to the combined action of gravity moving them downward and the transverse agitation given to the platen by eccentric 11. The chute 19 is designed to catch all the articles which are discharged off the lower end of the plate 18 and deliver them at the lower end of the chute 19 into a receptacle 25, the chute 19 being provided with flanges to confine the articles to the proper path into the receptacle. The receptacle 25 is supported by four links 26 and 27, two at each end. These links are pivotally connected to the receptacle 25 at their outermost ends, and the lower links 26 are fulcrumed near their inner ends on stanchions 28 supported on the bed plate 1 by means of a fulcrum shaft 29. The inner ends of the upper links 27 are pivoted at 30 to bell cranks 31, mounted on the fulcrum shaft 29, one at each end. These bell cranks are provided with a handle shown at 32 whereby they may be rocked about the fulcrum shaft for the purpose of lifting the receptacle 25 to its uppermost position, as shown in dotted lines in Figure 2, which position, owing to the relative motion of the links 26 and 27, will cause the receptacle to be inverted and thereby dump more or less of its contents onto the distributing platen 18. The opening which is in the upper part of receptacle 25, as shown clearly in Figure 1, shifts to the lower part of the receptacle when the same is raised to its upper position. Adjustable stops 33 and 34 limit the lowermost position of the links 26 and bell cranks 31. Stops 35 limit the upper motion of the bell cranks, the upper position of the same being shown in dotted lines in Figure 2. Stops 36 limit the upper position of the links 26. On the fulcrum shaft 29 is mounted a crank arm 37 (see Figures 6 and 9) and at the end of this crank arm a cam rod 38 is pivotally supported. Near the lower end of this cam rod is a wedge section 39 which, when the bell cranks 31 are elevated by the operator pulling on the handle 32, is caused to push to one side a lever 40, shown in detail in Figure 22. The outer end of this lever is articulated to a reciprocating tripper rod 41 (see Figures 5, 6, 7 and 8), the purpose of which is to release a pawl 42' so that a spring 43 may force the pawl against a stop 44 (see Figure 7) whereupon the pawl 42 holds back the rod 41 into its retracted position so that it will stay retracted notwithstanding the fact that the wedge 39 is withdrawn by the operator lowering the receptacle 25. When the wedge 39 pushes on the lever 40, as just described, it causes said lever to impinge against a resilient attachment 42 on the end of the shaft 5, the result of which is to move the said shaft endwise until the friction gear 4 is brought into contact with friction pinion 3 on the motor 2, the spring in the resilient member 42 serving to keep the gears in yielding contact. This condition of contact of gears will remain as long as the lever 40 stays in its locked position by reason of the connecting rod 41 being held in its outermost position by means of pawl 42'. The friction gears being thus brought into contact, will cause the table 15 to be vibrated by means of the connecting rod 12 and eccentric 11. This vibration will continue until the gears are again separated, which is accomplished in the following manner: Mounted on the shaft 5 is a rocker sleeve 45 at one end of which an arm 46 articulates with an eccentric rod 47, which is driven by an eccentric 48 mounted on shaft 9. The eccentric rod 47 may be pivoted at any one of a number of places on the arm 46 to vary the stroke of the same. On the other end of the rocker sleeve 45 is a rocker arm 49 (see Figures 5 and 7) the outer end of which carries a spring-pressed pawl 50, the tooth of which engages with the tooth of a spur gear or ratchet wheel 51. By means of this mechanism, it will be understood that as long as the gears 3 and 4 are in contact, a reciprocating motion will be given to the rocker arm 49 and through the medium of the pawl 50 a step-by-step motion imparted to the gear wheel 51. A spring 52 is provided to hold the gear strictly to its step-by-step motions. On the gear 51 is a pin 53 (see Figures 5 and 7) which, after a certain time has elapsed—which time will be regulated by the time it takes for the articles to slide over the distributing table or platen—will come in contact with the end 54 of a pivoted weight 55, whereby the weight will be raised until such time as the pin 53 moves off from the end of the arm 54 of the weight, whereupon the weight in dropping will, through the medium of an extension arm 56, knock against an arm 57 on the pawl 42, overcoming the friction of the rod 41 and the resistance of spring 43, and moving the said pawl sufficiently to release the rod 41, which will then be free to be moved into its intercepting position, which movement is brought about by means of the resilient member 42 on the end of the shaft 5. At the same time, the resilient member 42, being free of pressure, allows the friction gear 4 to separate from pinion 3, thereby bringing to rest the reciprocating table, which position of rest is rendered necessary by the next step in the operation of the machine, namely, that of removing the distributed articles from the machine to the mold.

I will now describe the means whereby the articles are distributed to prearranged locations. The essential requirements of the placing of individual articles according to a prearranged plan must be these:—

First: There must be one article in each receptacle.

Second: There must be no other article left on the distributing plate.

As each article must be placed with a certain degree of accuracy in its predetermined position, the problem resolves itself into a means of so guiding the articles that each receptacle will have a chance to receive at least one of the articles and to refuse to hold more than one. The latter requirement I attain by having the depth of the receptacle in the distributing platen approximate the thickness of the article so that the receptacle cannot hold more than one. Additional articles will slide over the top of the one already seated. To attain the first object, I employ a set of riffles for guiding the articles to the receptacles.

Figure 10:
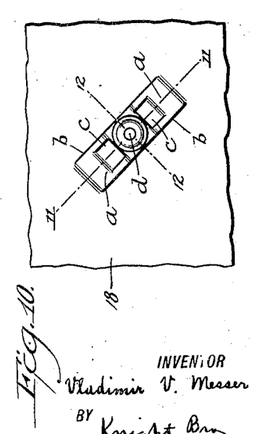
Figure 10 is a detail plan of one of the riffles.
Figure 11:
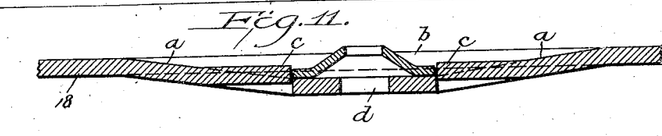
Figure 11 is a longitudinal section through the middle of the riffle showing a washer caught therein.
Figure 12:
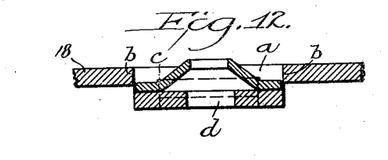
Figure 12 is a section at right angles to that of Figure 11.

In building machinery where the articles are moved over an inclined plane by force of gravity, it is necessary to employ an oscillating motion to make the articles move down grade at a uniform speed. It is necessary to have a live table, because the loose articles laid on a stationary inclined plane will stay on the inclined plane until such angle is given to the table, which would overcome the initial friction. Once this initial friction is overcome, the articles rush down in the manner of a landslide. The angle of the inclined plane is, therefore, set at something less than the critical angle of free sliding and then by a reciprocating motion at right angles to the inclination of the plane, the articles are caused to pass downward in a zig-zag path. I, therefore, set the riffles at an angle to the sides of the plane so that the articles will slide into the riffles and not across them. In order that the articles shall not jump the riffles, the receptacles are placed at the bottom of an incline in each riffle so that the articles will have time to lower themselves into the receptacles and not get jumped across. In Figures 10, 11 and 12, I have shown a form of riffle and receptacle that has proven satisfactory. These riffles and receptacles are produced by a stamping die which makes both the receptacles and riffles in one operation. The stamping die produces a rectangular depression in the sheet with inclined ends as shown at $a$ in Figure 11. The depression has sharp edges $b$ which act as guides or riffles when the articles travel over the plate. When an article finds its way between the edges $b$, it continues to move on until it gets between stops $cc$ which are formed as shown by the die when it is making the riffles. It is then seated on a proper center upon the middle portion of the depression, which middle portion has a perforation shown at $d$, which is necessary for admission of air when suction is employed to transfer the washers from the plate elsewhere. In the particular embodiment of my invention shown, the articles consist of washers characterized by a dished central portion and it is necessary that these washers shall only lodge in the receptacles when the dished center is upward. The edges $b$ are, therefore, made of such an elevation as will allow the washers to get caught only when they are presented with the right side down. All other washers will slip over them. When the articles travel down the oscillating table, the line of travel of each article will be zig-zag, the pitch of the zig-zag depending upon the grade of incline of the table and the amplitude of the stroke of the table. With the proper amount of articles being dumped upon the table, these functions of grade and stroke may be so adjusted as to insure at least one article entering every receptacle without a possibility of a miss. This will be appreciated when it is noted that even with a limited number of articles, it is comparatively easy to so arrange the stroke and pitch to insure that every part of the plate is traversed by the articles.

When the superfluous articles have all been shaken off of the distribution plate onto the return chute and from thence into the receptacle, the distribution plate will have one article in each receptacle, the relative positions of the articles corresponding with the layout required. When this has been accomplished, the machine automatically stops vibrating and the articles are then ready to be transferred to their new location in the mold.

The mechanism whereby the layout of articles are bodily transferred from the distribution plate to a new location without changing their relative locations, will now be described.

A transfer plate 58 of a size to entirely cover the layout has guide holes adapted to fit over dowel pins 59 that rise above the surface of the distribution plate 18. These dowel pins are shown in detail in Figures 3 and 4 and are made with shoulders 60 which form supports for the transfer plate. The upper part of the dowels 61 telescopes into tubular dowel supports formed in the platen supports 23. A spring 62 tends to keep the dowel in its uppermost position. It will be seen, therefore, that when the plate 58 is placed on the dowels, it will be held up and away from the distribution plate and its superposed articles. The transfer plate 58 is provided with orifices corresponding in number and position to the receptacles in the plate 18. The edges of the orifices may be flanged downwardly (see Figure 23) and the size is made such that the washers will be accurately centered in the orifice by the beveled cone of the washer. A suction lifting device comprising concave or dished cover 63, having flexible contact lips 64 of rubber or the like, is adapted to be applied to the top of the transfer plate 58.

Figure 2:
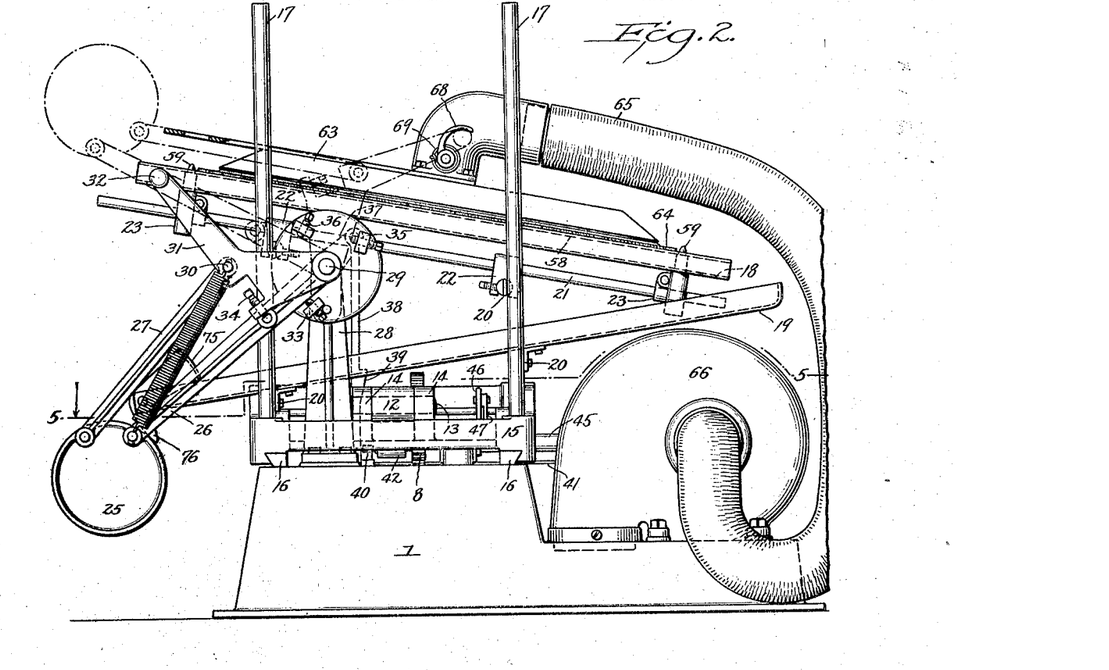
Figure 2 is an end elevation.
Figure 3:
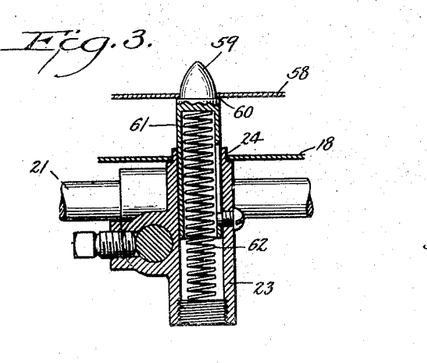
Figure 3 is a detailed section of the centering pin on line 3—3 of Figure 4.
Figure 4:
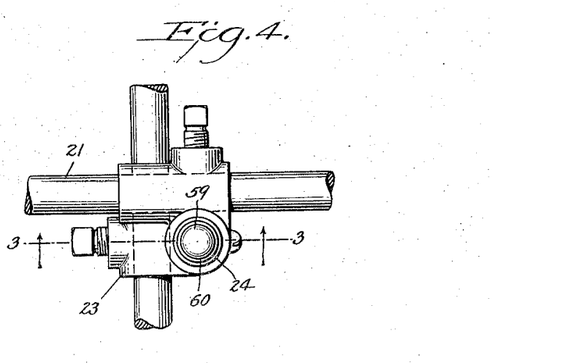
Figure 4 is a plan view of the same detail.
Figure 5:
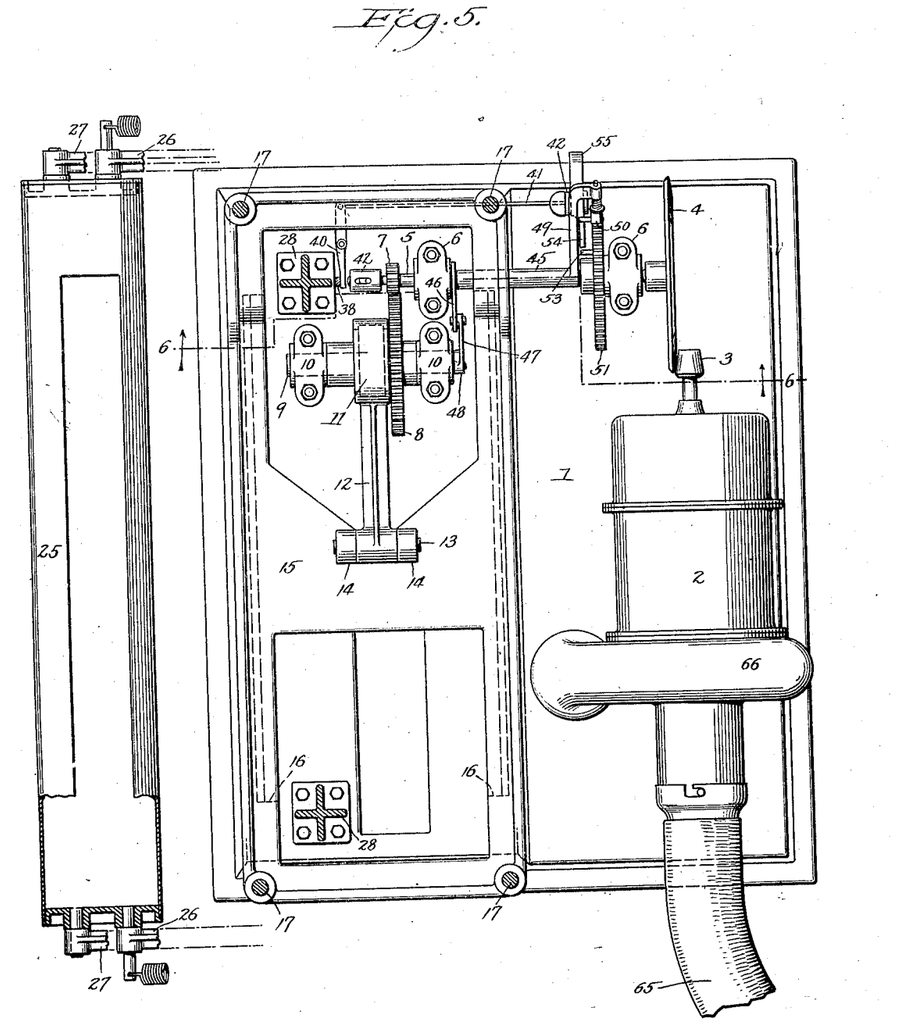
Figure 5 is a horizontal section on line 5—5 of Figure 2.
Figures 13, 14:
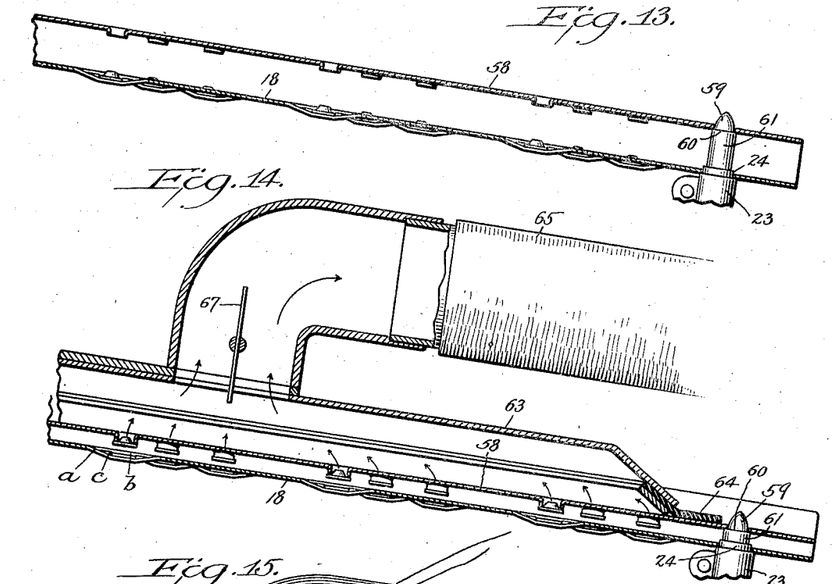
Figure 13 is a section through the riffle plate and the transferring plate.
Figure 14 is a similar section with the suction lifter applied.
Figure 15:
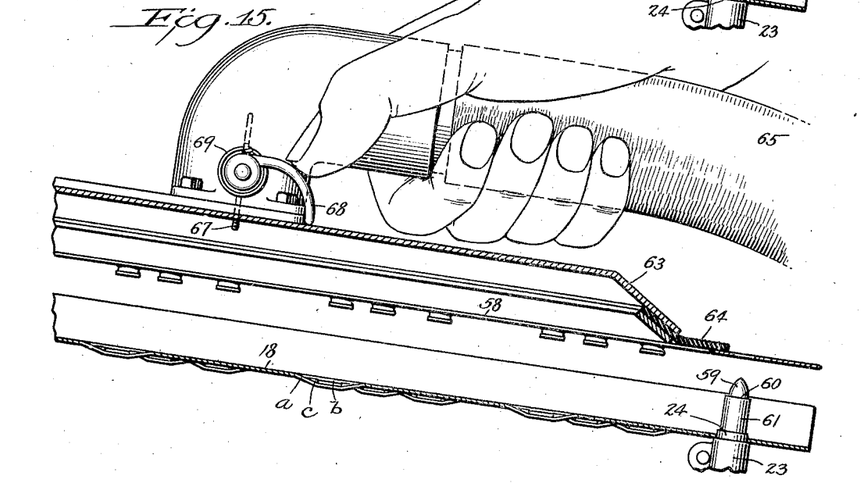
Figure 15 is a similar section, but in partial elevation, showing the suction lifter with the separator plate held to it, in the act of removing the same.

The cover plate 63 communicates by pipe 65 with an air exhaust pump 66 coupled directly to the motor 2, as shown in Figures 2, 5 and 14. A wing valve 67 in the exhaust pipe 65 has a trigger 68 in convenient location to be depressed by the thumb of the operator as he grasps the exhaust pipe 65 in using it as a handle with which to lift the cover. A spring 69 tends to close the wing valve across the exhaust pipe.

The operation of this transferring mechanism is as follows:—

Figures 16, 23:
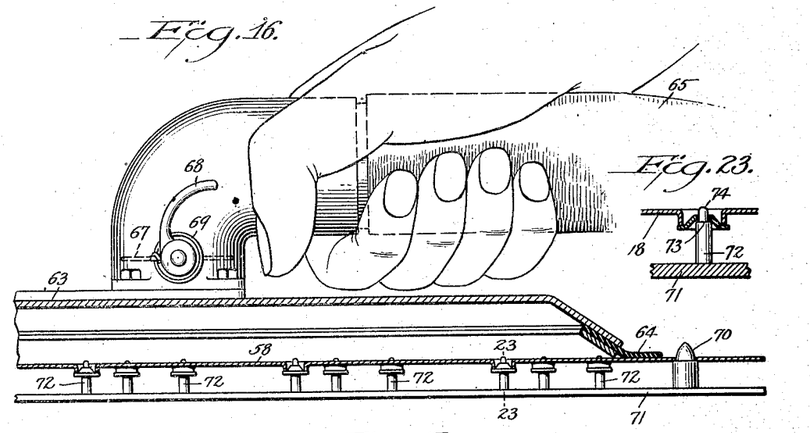
Figure 16 illustrates the manner in which the transferring plate applies the washers to the pins in the mold.
Figure 23 is a section on line 23—23 of Figure 16, showing one of the washers placed in its final position in a mold pin.
Figure 17:
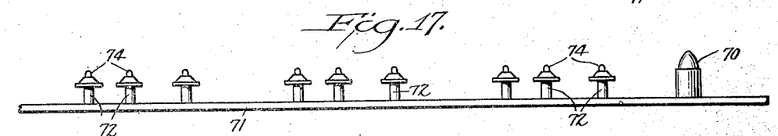
Figure 17 shows the washers applied to the pins after the transferring plate has been removed.

The transfer plate 58 having been placed on the dowel pins, as shown in Figure 13, the operator grasping the exhaust pipe applies the cover 63 to the transfer plate and presses the same down until the said transfer plate comes in close proximity to the distribution plate, as shown in Figure 14. The operator then depresses the trigger 68, thereby opening the wing valve 67 and exposing the interior of the cover to the suction of the exhaust pump. This will cause a rush of air through the holes in the center of the receptacles, and will lift the articles seated therein until they come to rest against the corresponding openings in the transfer plate, as clearly shown in Figure 14. With the vacuum still holding the articles against the lower side of the transfer plate, the operator lifts the cover, which by its suction, holds onto the transfer plate and is thereby enabled to transfer the said plate to its proper position in the mold, as shown in Figure 16, wherein 70 represents dowel pins fastened in the mold and adapted to register with the same holes in the transfer plate that registered with the dowels 59 of the distribution plate. The base of the mold is indicated at 71 and the centering pins 72, shown in detail in Figure 23, have shoulders 73 surrounding a centralizing top 74 for centering and supporting the washers in their final position in the mold. With the washers thus placed on the mold pins, the operator moves his thumb from the trigger 68, whereupon the vacuum being broken, the cover may be lifted and then the transfer plate removed, leaving the washers transferred to the mold pins in the same relative positions as they occupied in the original layout on the distribution plate, as shown clearly in Figure 17.

The distribution plate is removable and may be replaced by another having a different layout, as for example, for a different size of heels. The transfer plate must, of course, be changed also as the layout of the two plates must always correspond. For this reason, the transfer plate is not made integral with the suction device as the latter may be used for plates of various designs.

It will be seen from the above description that a means is provided for automatically placing individual articles according to a predetermined layout and that another means is provided for taking up these articles bodily without disturbing their prearranged relative positions and that these means, being portable, enable the operator to place the distributed articles, still arranged according to the predetermined layout, in a second location, and that said means has the additional function of releasing the articles so placed so as to leave them according to the designed layout in their final location when the transferring means is removed.

While I have shown and described one particular embodiment of my invention, it is obvious that the various functions of the machine may be performed by alternative devices, which will naturally occur to those skilled in the art without their being mentioned here.

I claim:—

1. In apparatus for transferring a layout of articles from a first to a second location, the combination of a distribution plate having depressions arranged according to the desired layout, a portable transfer plate fitting over the distribution plate, means for simultaneously lifting the articles in their laid-out position from the distribution plate to the transfer plate, and means for simultaneously depositing the articles from the transfer plate to the second location.

2. In a machine for distributing articles according to a prearranged plan, the combination of an inclined distributing plate having receptacles arranged according to the desired plan, with riffles guiding to said receptacles, said riffles being angularly disposed with reference to the path of articles over said plate, and means for shaking the plate to cause the articles to follow a zig-zag path.

3. In a machine for distributing articles according to a prearranged plan, the combination of an inclined distributing plate having receptacles arranged according to the desired plan, with riffles guiding to said receptacles, said riffles having inclined, leading-in surfaces, and means for shaking the plate to cause the articles to follow a zig-zag path.

4. In a machine of the character set forth, the combination of a vibrating recessed plate, power-driven means for vibrating said plate, means for dumping articles upon said vibrating plate, and means operated by said dumping means for throwing into action said power-driven means.

5. In a machine for distributing articles according to a prearranged plan, the combination of a vibrating plate, motive power means for vibrating the plate, means for dumping articles onto the vibrating plate, and means for starting the motive power when the articles are being so dumped and for stopping the motive power after a predetermined number of vibrations.

6. In a machine for distributing articles according to a prearranged plan, the combination of a vibrating plate, motive power means for vibrating the plate, a receptacle adapted to receive the articles discharged from the plate, means for dumping the articles from the receptacle onto the vibrating plate, and means for starting the motive power when the articles are being so dumped and for stopping the motive power after a predetermined number of vibrations.

7. In an apparatus for depositing a plurality of articles in prearranged locations, a receptacle for such articles, a distributing mechanism for preliminarily arranging the articles in locations corresponding to those they are finally to occupy and vacuum transferring mechanism adapted to lift the articles from the distributing mechanism and hold the same in suspension while being transferred and to release the articles when finally placed in said receptacle by the breaking of the vacuum.

8. In a machine for placing a plurality of articles on a receiving plate, the combination of a distribution plate having receptacles corresponding in position to the position the articles are to have on the receiving plate, a transfer plate, guiding means on the distribution plate for the transfer plate, a receiving plate, guiding means on the receiving plate for the transfer plate, and resilient means for supporting the transfer plate over the distribution plate.

9. In a machine for distributing a plurality of articles according to a prearranged layout, an inclined distribution plate having receptacles corresponding to the position the articles are to occupy, means for vibrating said plate, a receptacle for the articles, a chute for returning the surplus articles from the vibrating plate to the receptacle when in its lower position, and means for elevating the receptacle and dumping the contents upon the plate.

10. In a machine of the character set forth and as a means of transferring grouped articles from a laying-out location to a using location, the combination of a vacuum producing apparatus, a freely movable manually controlled lifting cover having a hand grip, a flexible pipe connection between the said vacuum apparatus and the said cover, a shut-off valve in said pipe connection, and an operating handle for said shut-off valve arranged adjacent to said hand grip.

11. In a machine of the character set forth and as a means of transferring grouped articles from a laying-out location to a using location, the combination of a vacuum-producing apparatus, a movable lifting cover having a flexible contact lip of rubber, and a flexible pipe connection between the said vacuum apparatus and the said cover.

12. In a washer positioning apparatus, a sorting table having a plurality of shallow recesses adapted to trap individual washers, and a transfer plate adapted to pick up the washers from the recesses.

13. In apparatus for placing heel washers according to a predetermined layout, the combination of a distribution plate having receptacles arranged according to the desired layout, each receptacle adapted to hold but one washer disposed flatwise, with means adapted to be applied to the washers to lift them flatwise from the receptacles and transfer them to a new location without changing their relative position.

14. In a heel washer positioning apparatus, a sorting table having recesses adapted to trap only individual washers with the concave side downward, and a transfer device having a plurality of lifters equipped with means adapted to apply an attractive force to the individual washers and to lift the same from said recesses.

15. In apparatus for placing dished heel washers according to a predetermined layout, the combination of a distribution plate having receptacles arranged according to the desired layout, each receptacle being of a depth to hold but one washer with the concave side down while rejecting washers with the concave side up, with means adapted to be applied to the washers to lift them flatwise from the receptacles and transfer them to a new location without changing their relative position.

16. In apparatus for placing heel washers according to a predetermined layout, the combination of a distribution plate, having receptacles arranged according to the desired layout, each receptacle adapted to hold but one washer disposed flatwise, with lifting means adapted to be applied to the washers to lift them flatwise from the receptacles and transfer them to a new location without changing their relative position, and means for disengaging the washers from the lifting means.

17. In a heel washer positioning apparatus, a sorting table having recesses adapted to trap only individual washers with the concave side downward, and a transfer device having a plurality of lifters equipped with means for producing an attractive force to be applied to the individual washers and to lift the same by attraction from their receptacles, and means for overcoming the attractive force to cause the release of the washers.

18. In apparatus for placing dished heel washers according to a predetermined layout, the combination of a distribution plate having receptacles arranged according to the desired layout, each receptacle being of a depth to hold but one washer with the concave side down, while rejecting washers with the concave side up, with means adapted to be applied to the upper surface of the washers to lift them flatwise from the receptacles and transfer them to a new location without changing their relative position.

19. In apparatus for placing heel washers according to a predetermined layout, the combination of a distribution plate having receptacles arranged according to the desired layout, each receptacle adapted to hold but one washer disposed flatwise, with portable manually controlled means adapted to be applied to the washers to lift them flatwise from the receptacles and transfer them to a new location without changing their relative position.

20. In a heel washer positioning apparatus, an inclined sorting table having recesses adapted to trap only individual washers with the concave side downward, means for shaking the plate to distribute the washers, and a transfer device having a plurality of lifters adapted to be applied to the upper surface of the individual trapped washers and to lift the same from their receptacles without changing their relative position.

21. In apparatus for placing dished heel washers in a vulcanizing mold according to a predetermined layout, the combination of a distribution plate having receptacles arranged according to the desired layout, each receptacle being of a depth to hold but one washer with the concave side down while rejecting washers with the concave side up, with means adapted to be applied to the upper surface of the washers to lift them flatwise from the receptacles and transfer them to a new location without changing their relative position, and means for causing the transfer to register with respect to the receptacles on the distributing plate and with the washer receiving pins in the vulcanizing mold.

VLADIMIR V. MESSER.